United States Patent
Hrischuk et al.

(10) Patent No.: US 9,400,667 B2
(45) Date of Patent: Jul. 26, 2016

(54) STRING CACHE FILE FOR OPTIMIZING MEMORY USAGE IN A JAVA VIRTUAL MACHINE

(71) Applicant: International Business Machines Corporation, Armonk, NY (US)

(72) Inventors: Curtis E. Hrischuk, Holly Springs, NC (US); Andrew Russell Low, Stittsville (CA); Peter Duncan Shipton, Ottawa (CA); John Joseph Stecher, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 14/136,031

(22) Filed: Dec. 20, 2013

(65) Prior Publication Data

US 2014/0115585 A1    Apr. 24, 2014

Related U.S. Application Data

(63) Continuation of application No. 12/839,330, filed on Jul. 19, 2010, now Pat. No. 8,839,215.

(51) Int. Cl.
*G06F 9/45* (2006.01)
*G06F 9/455* (2006.01)
*G06F 9/50* (2006.01)

(52) U.S. Cl.
CPC ........ *G06F 9/45533* (2013.01); *G06F 9/45558* (2013.01); *G06F 9/5016* (2013.01); *G06F 2009/45583* (2013.01)

(58) Field of Classification Search
CPC .................................... G06F 9/44; G06F 9/45
USPC .......................... 717/151, 152, 153, 154, 148
See application file for complete search history.

(56) References Cited

U.S. PATENT DOCUMENTS

| | | | |
|---|---|---|---|
| 4,962,451 A | 10/1990 | Case et al. | |
| 5,414,842 A | 5/1995 | Archer et al. | |
| 5,787,431 A | 7/1998 | Shaughnessy | |
| 5,883,640 A * | 3/1999 | Hsieh | G09G 5/393 345/467 |
| 6,081,665 A | 6/2000 | Nilsen et al. | |
| 6,098,080 A * | 8/2000 | Endicott | G06F 12/0253 |
| 6,530,080 B2 * | 3/2003 | Fresko et al. | 717/166 |
| 6,971,097 B1 * | 11/2005 | Wallman | 718/101 |
| 7,565,664 B2 * | 7/2009 | Kondo et al. | 719/319 |

(Continued)

OTHER PUBLICATIONS

Kawachiya ("Analysis and Reduction of Memory Inefficiencies in Java Strings") Oct. 2008.*
Kawachiya ("Analysis and Reduction of Memory Inefficiencies in Java Strings"), Oct. 19, 2008.*
Chin et al., "Efficient Character-Level Taint Tracking for Java," ACM Digital Library, pp. 3-14, Nov. 2009.
Agosta et al., "Jelatine: A Virtual Machine for Small Embedded Systems," ACM Digital Library, pp. 170-180; Oct. 2006.
Haubl et al., "Optimized Strings for the Java HotSpot(TM) Virtual Machine," Dialog/Ei Compendex, Sep. 2008.
Kawachiya et al., "Analysis and Reduction of Memory Inefficiencies in Java Strings," ACM OOPSLA Conference 2008, USA.
Green, "Interned Strings: Java Glossary," Canadian Mind Products, http://mindprod.comfiglossiinterned.html, Aug. 2008.
Gamma et al., "Design Patterns: Elements of Reusable Object-Oriented Software," pp. 81-136, 195-206, Sep. 1999, China.

(Continued)

*Primary Examiner* — Chat Do
*Assistant Examiner* — Jae Jeon
(74) *Attorney, Agent, or Firm* — Sughrue Mion, PLLC.

(57) ABSTRACT

A method, system and computer program product for optimizing memory usage associated with duplicate string objects in a Java virtual machine. The method comprises scanning a heap of the Java virtual machine at the end of the start-up process of the virtual machine to identify duplicate strings associated with the virtual machine, storing the identified strings in a string cache file, and determining whether a new string that needs to be created during start-up already exists in the string cache file. The duplicate strings are added to an interned strings table. A reference to a duplicate string is returned if a string to be created is already in the string cache file.

10 Claims, 7 Drawing Sheets

(56) References Cited

U.S. PATENT DOCUMENTS

| | | | |
|---|---|---|---|
| 7,882,089 B1* | 2/2011 | Levy | G06F 17/30483 707/705 |
| 2003/0208479 A1 | 11/2003 | Todd | |
| 2004/0010634 A1* | 1/2004 | Takashima | G06F 17/243 710/1 |
| 2006/0070051 A1* | 3/2006 | Kuck | G06F 9/544 717/162 |
| 2007/0032228 A1* | 2/2007 | Varanda | G06F 9/4418 455/418 |
| 2007/0169025 A1* | 7/2007 | Moore et al. | 717/139 |
| 2007/0245090 A1 | 10/2007 | King | |
| 2009/0070354 A1 | 3/2009 | Chellapilla | |
| 2009/0125515 A1 | 5/2009 | Goetz | |
| 2009/0187713 A1 | 7/2009 | Zedlewski et al. | |
| 2009/0271867 A1* | 10/2009 | Zhang | G06F 21/566 726/24 |
| 2012/0089962 A1* | 4/2012 | Centonze et al. | 717/110 |

OTHER PUBLICATIONS

Koshy et al., "Optimizing Embedded Virtual machines," IEEE CSE 2009 Conference, pp. 342-351, NJ, USA.

Non-Final Office Action dated Mar. 21, 2013 issued in U.S. Appl. No. 12/839,330.

Final Office Action dated Sep. 3, 2013 issued in U.S. Appl. No. 12/839,330.

* cited by examiner

STRING CACHE FILE FOR OPTIMIZING MEMORY USAGE IN A JAVA VIRTUAL MACHINE

CROSS-REFERENCE TO RELATED APPLICATIONS

The present application is a continuation of application Ser. No. 12/839,330 filed Jul. 19, 2010, the disclosure of which is hereby incorporated by reference in its entirety.

FIELD OF THE INVENTION

The invention relates generally to computer software, and more particularly, to a string cache file for optimizing memory usage associated with duplicate strings in a Java virtual machine (JVM).

BACKGROUND

A virtual machine is a set of computer programs and data structures that use a specified model for the execution of other computer programs and scripts. According to one such model, a virtual machine accepts a form of computer intermediate language commonly referred to as bytecode. This language conceptually represents the instruction set of a stack-oriented computer system.

A Java virtual machine (JVM) is a key component of a Java system and is available for many computer hardware and software platforms. The use of the same bytecode for all platforms allows a Java program to be compiled once and run in different computer environments. The Java virtual machine also enables features such as automated exception handling for providing debug information on software errors independent of the source code. A Java virtual machine implementation is often distributed along with a set of standard class libraries that implement a Java API (Application Programming Interface). An Application Programming Interface is a component through which a computer system, library or application use to exchange control information and data among them.

Programs intended to run on a Java virtual machine must be compiled into a standardized portable binary format, which typically comes in the form of bytecode executable files. A program may consist of many classes in different files. For easier distribution of large programs, multiple class files may be packaged together in a Java archive file called a "jar" file. At run-time, the Java virtual machine executes the bytecode executable files and jar files.

There exists a need for an efficient way of reducing the amount of memory used for duplicate strings in virtual machines at run-time.

SUMMARY

The invention relates to a string cache file in a virtual machine for reducing memory usage associated with duplicated strings. More particularly, the invention provides an efficient method and system for optimizing memory usage in a virtual machine, comprising scanning a memory heap of the virtual machine at the end of the start-up mode to identify duplicate strings, storing the identified strings in a string cache file, and checking the string cache file when a new string is created to determine if the new string is already in the string cache file. The string cache file is a memory mapped file and persistently exists on disk storage. It is memory-mapped into a virtual machine process and exists in system memory.

The details of the preferred embodiments of the invention, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION OF THE INVENTION

Figure 1:
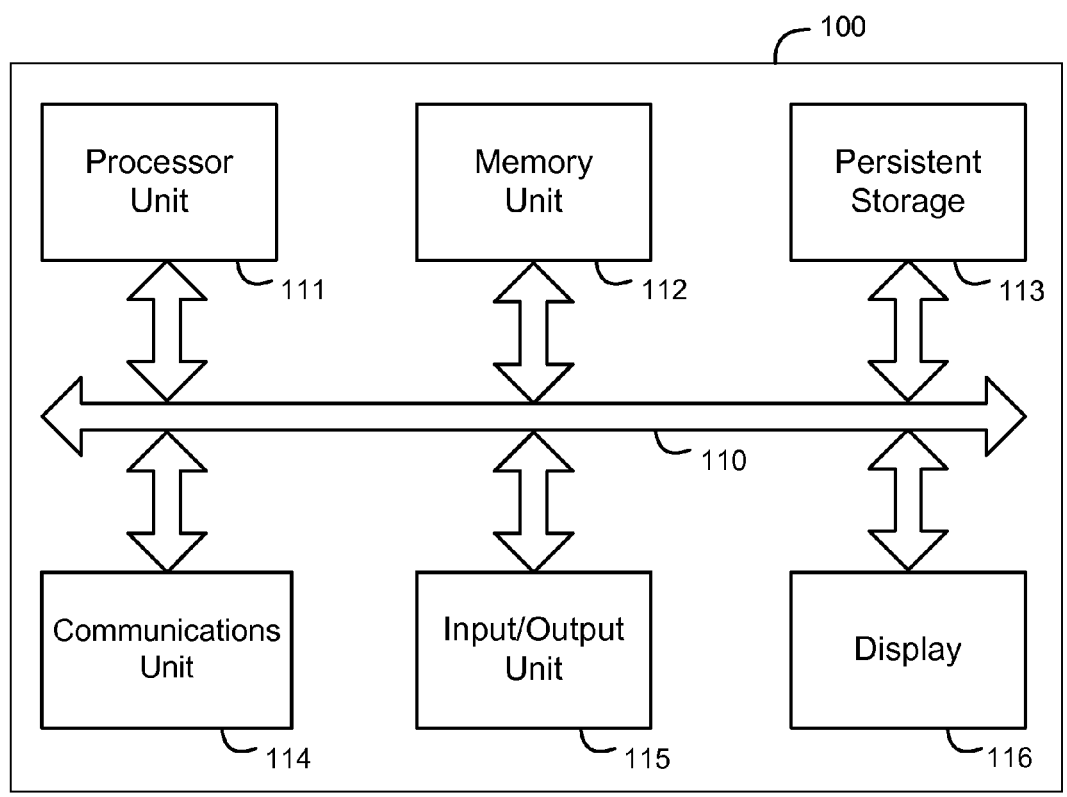
FIG. 1 is a block diagram illustrating a typical computer system in which aspects of the invention may be implemented.

The invention relates generally to computer virtual machines. More particularly, the invention concerns a method, system and computer program product for reducing system memory used to accommodate duplicate string objects in a Java virtual machine during run-time using a string cache file.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a micro-processor of a general purpose computer, special purpose computer, or other programmable data processing apparatus to produce a machine, such that the instructions, which execute via the micro-processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a block diagram of a data processing system is illustrated in accordance with an exemplary embodiment of the present invention. Data processing system 100 includes a processor unit 111, a memory unit 112, a persistent storage 113, a communications unit 114, an input/output unit 115, a display 116, and system bus 110. Computer programs are typically stored in persistent storage 113 until they are needed for execution, at which time the programs are brought into memory unit 112 so that they can be directly accessed by processor unit 111. Processor 111 selects a part of memory 112 to read and/or write by using an address processor 111 gives to memory 112 along with a request to read and/or write. Usually, the reading and interpretation of an encoded instruction at an address causes processor 111 to fetch a subsequent instruction, either at a subsequent address or some other address.

Figure 2:
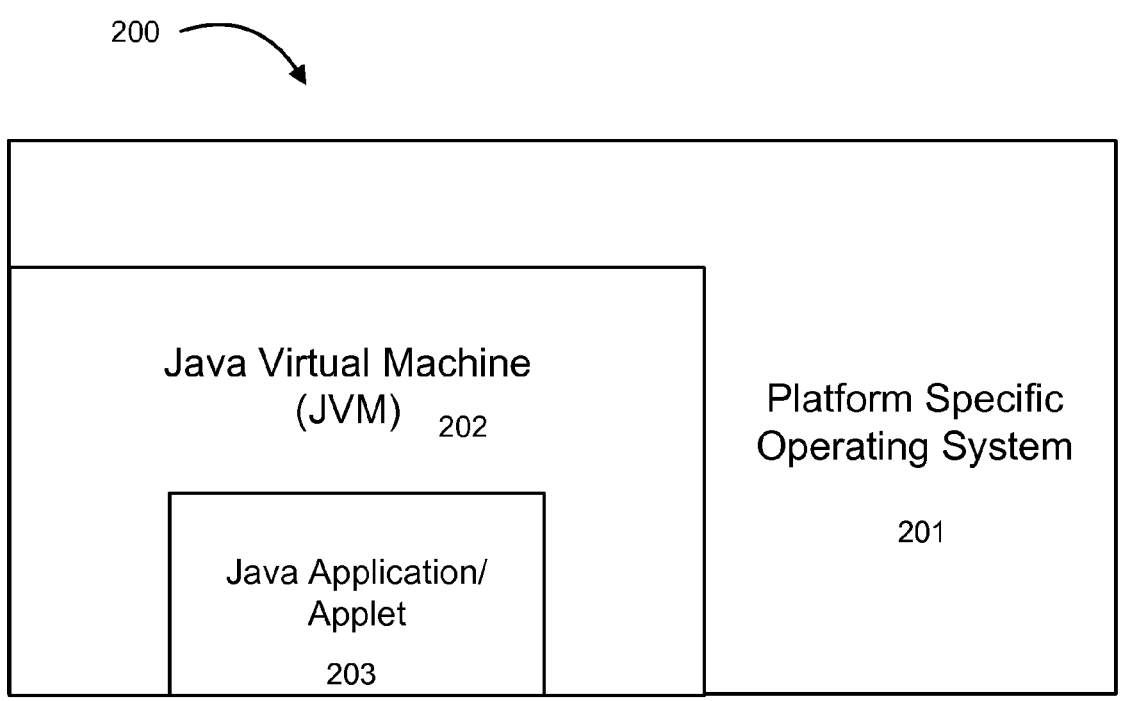
FIG. 2 is a block diagram showing an exemplary Java virtual machine in which aspects of the invention may be implemented.

FIG. 2 is a block diagram illustrating the relationship of software components operating within a computer system for providing aspects of an embodiment of the invention. System 200 contains a platform specific operating system 201 that provides hardware and system support to software executing on a specific hardware platform. In the illustrated instance, system 200 is Java-based and includes a Java virtual machine 202. However, other embodiments may not be Java-based and may include virtual machines other than Java virtual machines. Java virtual machine 202 is a computer application that may execute in conjunction with the operating system 201. Java virtual machine 202 includes logic components to provide a Java run-time environment with the ability to execute Java application or applet 203. Java application or applet 203 is a program or software component written in the Java programming language. The computer system in which Java virtual machine 202 operates may be similar to data processing system 100 described in FIG. 1. However, Java virtual machine 202 may be implemented in software or partially in hardware such as a Java chip, Java-on-silicon, or Java processor with an embedded picoJava core.

The Java virtual machine 202 supports a Java run-time environment including architecture, security features, mobility across networks and platform independence. Java virtual machine 202 is a virtual computer, i.e., a computer that is abstractly defined and implemented. This flexibility allows different Java virtual machines 202 to be designed for mainframe computers and PDAs. Java virtual machine 202 allows a program to be executed on different platforms as opposed to only the one platform for which the code was compiled. Programs are compiled for the Java virtual machine 202 before execution. In this manner, applications for many types of data processing systems may be supported, which may contain a variety of central processing units and operating system architectures.

To enable an application to execute on different types of data processing systems, a compiler typically generates an architecture-neutral file format that is executable on many processors with the presence of a run-time system. The compiler generates bytecode instructions that are nonspecific to a particular computer architecture. Bytecode is machine independent code generated by the compiler and executed by a interpreter. An interpreter is part of the Java virtual machine that alternately decodes and interprets bytecode. Bytecode instructions are designed to be easy to interpret on any computer and easily translated on the fly into native machine code. Bytecode is translated into native code by a just-in-time (JIT) compiler.

For improved performance, there have been attempts to reduce memory usage associated with string objects in recent Java virtual machine implementations. One approach is to store Java class files in a "class cache" file so that, on start-up, the class cache is memory-mapped into a process address space which can also be shared across multiple Java virtual machines. However, the class cache stores the compiled bytecode classes and does not differentiate the strings from the classes. As a result, this approach does not efficiently reduce the amount of memory space occupied by the duplicate strings as disclosed by the present invention.

Another method for minimizing system memory used for duplicate strings involves merging the individual character arrays that the strings point to (for some sub-set of the existing string objects) and then providing a start index and length for the merged character array. Although this approach partially reduces the memory usage by the string objects, the memory in the class files is still needed to hold the original character array.

Java implementations also provide a string method called "Intern" that searches an internal data structure to determine whether a string with a particular character array might already have been created. If such a string exists and is currently stored in the internal structure, then the Java virtual machine simply returns a reference to that string object rather than creating another string object. The reuse of many such strings stored in the data structure could result in a significant memory saving. If a string with the same character array does not exist, then the Java virtual machine creates a new string object, and saves the string object in the internal data structure so the next search will look it up in the data structure.

The "Intern" method, however, does not provide an automatic process for determining which strings should be interned. In addition, the string data structure is not portable across all Java virtual machine instances running in the same system to allow the Java virtual machine instances to reuse an existing string. The present provides these benefits in the described exemplary embodiments.

Figure 3:
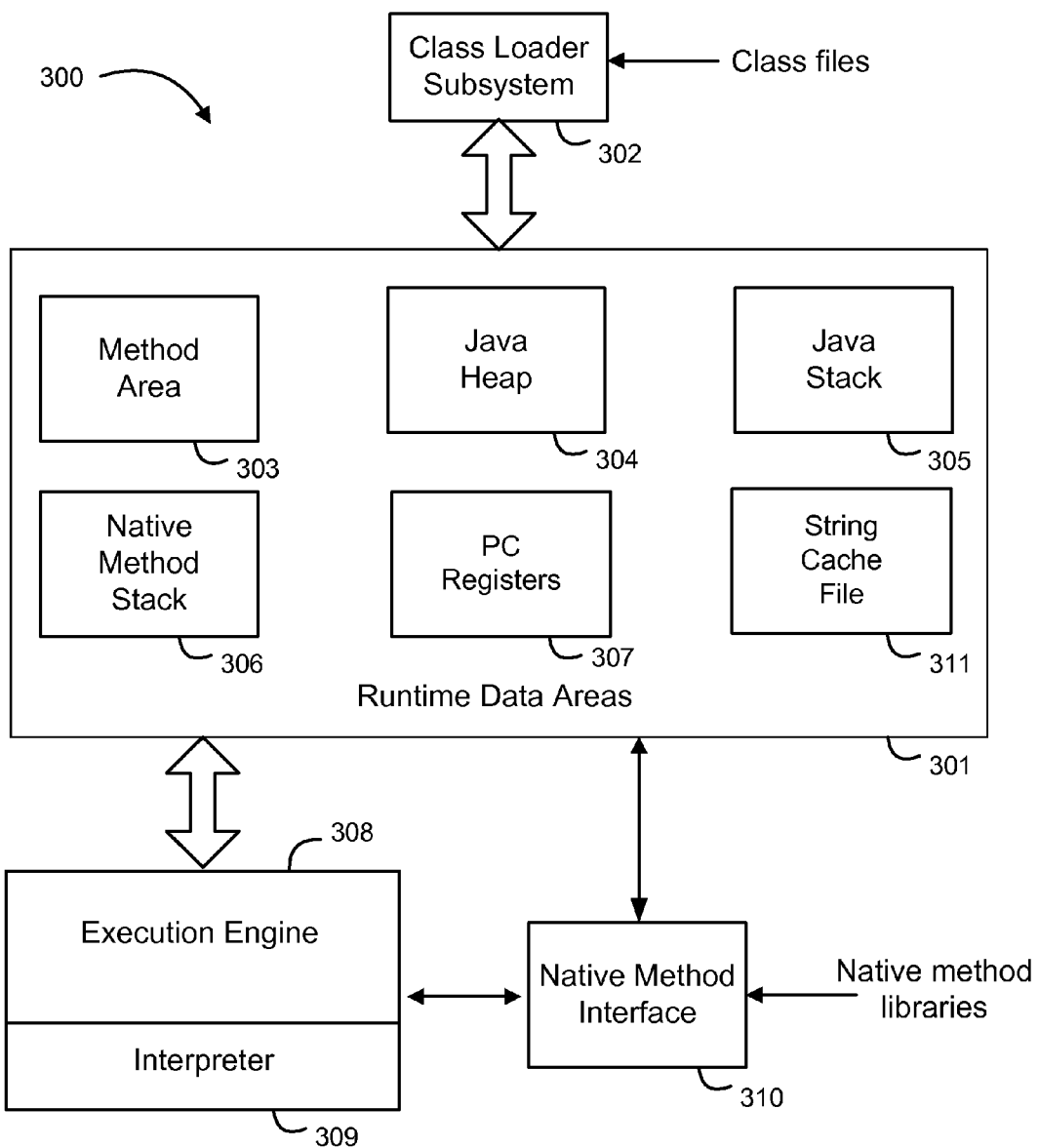
FIG. 3 is a block diagram illustrating a typical memory map of a Java virtual machine in run-time that includes the memory space occupied by components associated with the Java virtual machine.

FIG. 3 illustrates a block diagram of logic components in a virtual machine 300 at run-time, which is a Java virtual machine in the illustrated instance, but may be a non-Java virtual machine in other embodiments of the invention. Java virtual machine 300 includes a class loader subsystem 302, which is a mechanism for loading Java classes and interfaces. Once the Java virtual machine 300 loads the class files, it executes the bytecodes in them via an execution engine. The class loader 302 loads class files from an application and those from application programming interfaces (APIs) that will be needed by the application during run-time. The execution engine 308 that executes the bytecodes may vary across platforms and JVM implementations.

Java virtual machine 300 further contains run-time data areas 301, execution engine 308 and native method interface 310. Execution engine 308 is a mechanism for executing instructions contained in the methods of classes loaded by class loader subsystem 302. Interpreter 309 interprets the Java bytecodes at run-time. Native method interface 310 allows access to resources in the underlying operating system 201 such as native method libraries. Run-time data areas 301 contain native method stack 306, Java stack 305, PC registers 307, method area 303, and Java heap 304. These different data areas represent the organization of memory needed by Java virtual machine 300 to execute a program.

Java stack 305 may or may not reside within Java heap 304 depending on the implementation of the Java virtual machine 300 at run-time. If the Java stack 305 is in the Java heap 304, then it is represented as a single object for heap management purposes. Whether the Java stack 305 is in the Java heap 304 or not, the Java stack 305 contains meta information indicating frame boundaries for the call stack, method (function) parameters, and also serves as a location for temporary (local) variable and storage for intermediate results. Program counter (PC) registers 307 indicate the next instruction to be executed. Native method stack 306 stores the state of invocations of native methods. Method area 303 contains class data, while Java heap 304 contains all instantiated objects. Each time a class instance or array is created, the memory for the new object is allocated from Java heap 304. Java virtual machine 300 includes an instruction that allocates memory space within the memory for Java heap 304, but includes no instruction for freeing that space within the memory. Data areas 301 further includes a string cache file 311 as described in the exemplary embodiments of the invention, and in particularly with reference to FIGS. 4-7. The string cache file 311 can be in system memory and shared across several instances of the Java virtual machine 300. In addition, the string cache file 311 may be shared across virtualized guest operating systems. Such a cache sharing is especially useful in virtualization technology.

Figure 4:
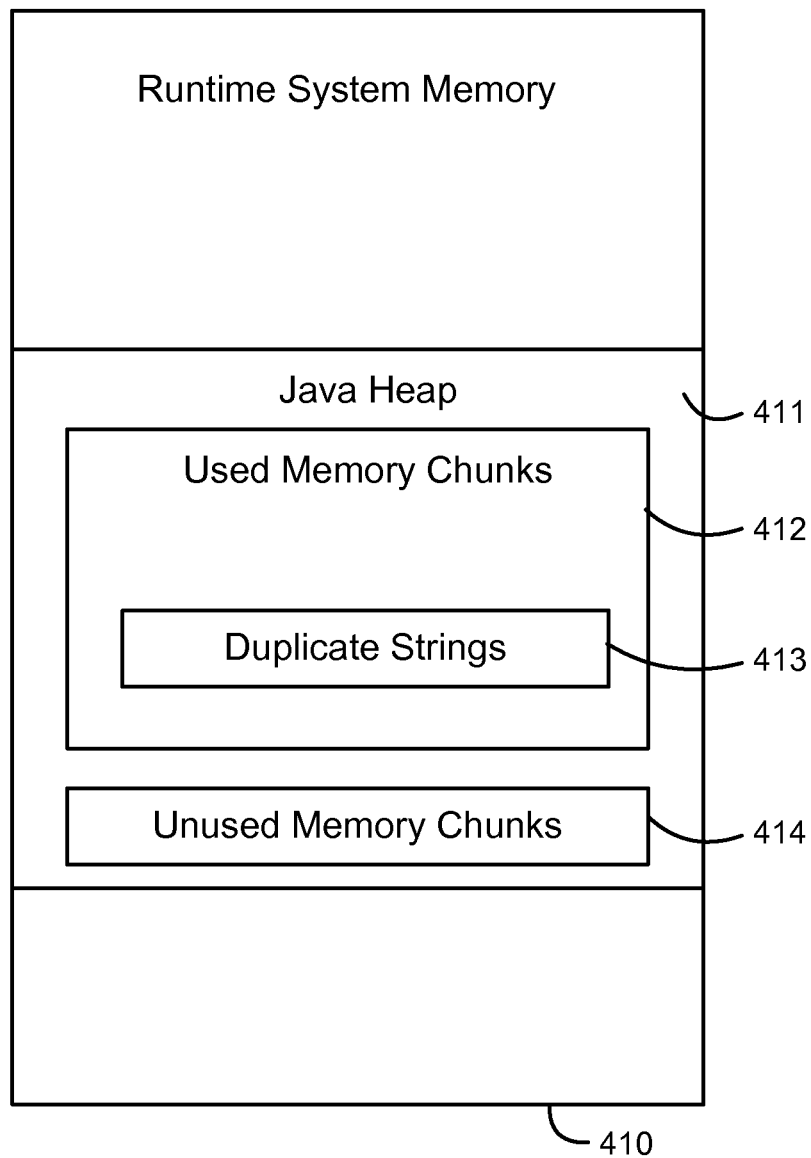
FIG. 4 is a block diagram illustrating the duplicate strings in a Java heap of a Java virtual machine in system memory during run-time

FIG. 4 is a block diagram showing a system map 410 at run-time that includes a Java heap 411 of Java virtual machine 300, according to an embodiment of the invention. Java heap 411 may be is a single, contiguous range of memory allocated by operating system 201 and may be divided into chunks of used memory (412) and unused memory (414). When Java virtual machine 300 creates new objects, operating system 201 allocates unused memory chunks 414 in response to requests from Java virtual machine 300. These objects may be strings or other types of objects, but string objects are very common artifacts of the Java programming language. The used memory chunks 412 may have one or many objects, and the object or objects may completely fill the chunks. Associated with each Java object is meta-data that describes the type of object and its size, if the size cannot be derived from the meta-data. An example of when an object size is needed is in the case of a string object where the object has a length.

In the Java programming language, a string object includes more than one sub-object. There is the string object itself, which is fixed in size, and the data portion of the string which is an array of characters of variable size. Although there are two objects associated with a string, it is often referred to as a single string object for simplicity.

Figure 5:
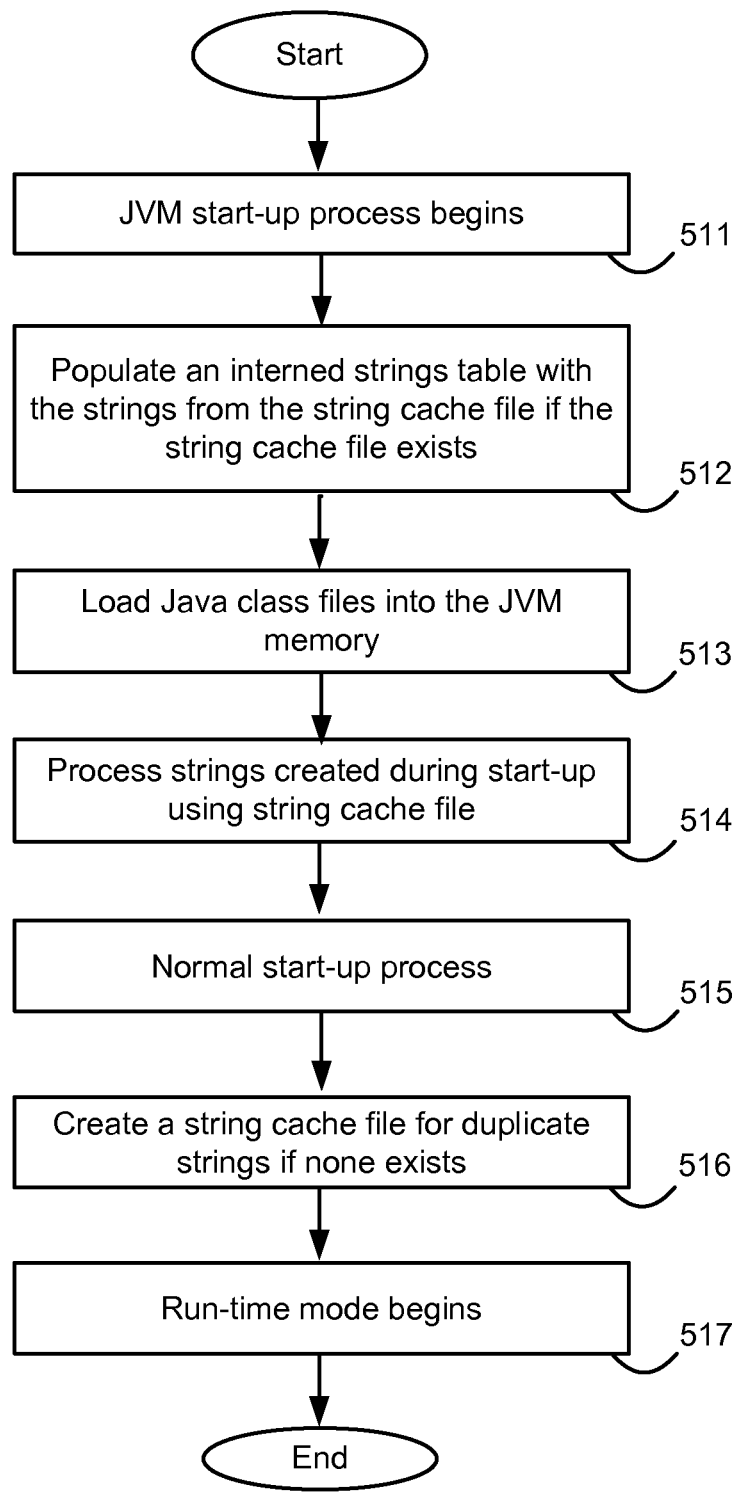
FIG. 5 is $_{[Romelia\ F1]}$ a flow chart of an exemplary process for optimizing the memory space used for duplicate string objects in a Java virtual machine, in accordance with aspects of the invention.

FIG. 5 is a flow chart representing an exemplary high-level process for minimizing memory usage associated with duplicate string objects in a virtual machine 300, in accordance with aspects of an embodiment of the invention. The virtual machine referred to in the flow chart is an example of a run-time instance of Java virtual machine 300 in FIG. 3, but may be a non-Java virtual machine in other embodiments of the invention. A virtual machine instance may be initialized when a Java application, such as Java application 203 in FIG. 2, is started. Further, the flow chart in FIG. 5 is generalized to cover the case in which a another virtual machine instance has previously created the string cache file 311, as well as the case where no string cache file currently exists in the system.

At block 511, the Java virtual machine instance begins its start-up process during which the Java virtual machine initializes parameters specific to the Java application. If a string cache file currently exists in the system, the Java virtual machine adds string objects in the string cache file 311 to an interned strings table, at block 512. Another Java virtual machine instance running in the system might have previously created the string cache file. In that case, other Java virtual machine instances do not need to create the string cache file again, but use the existing string cache file to populate the interned strings table. The Java virtual machine further loads relevant Java class files into the Java virtual machine's memory at block 513. For each class file, the Java virtual machine processes strings that need to be created during start-up using the string cache file, per block 514. Further details on the process for creating strings during start-up are described below with reference to FIG. 6. At block 515, the Java virtual machine continues with its normal start-up process. Once the normal start-up is completed, the Java virtual machine creates a string cache file for duplicate strings, if a string cache file did not exist at the beginning of start-up, at block 516. The first Java virtual machine instance running in the system typically creates the string cache file. Duplicate strings are the string objects that include a particular character array. They may be created by the current Java virtual machine instance or other virtual machine instances. The Java virtual machine next enters run-time mode at block 517.

Figure 6:
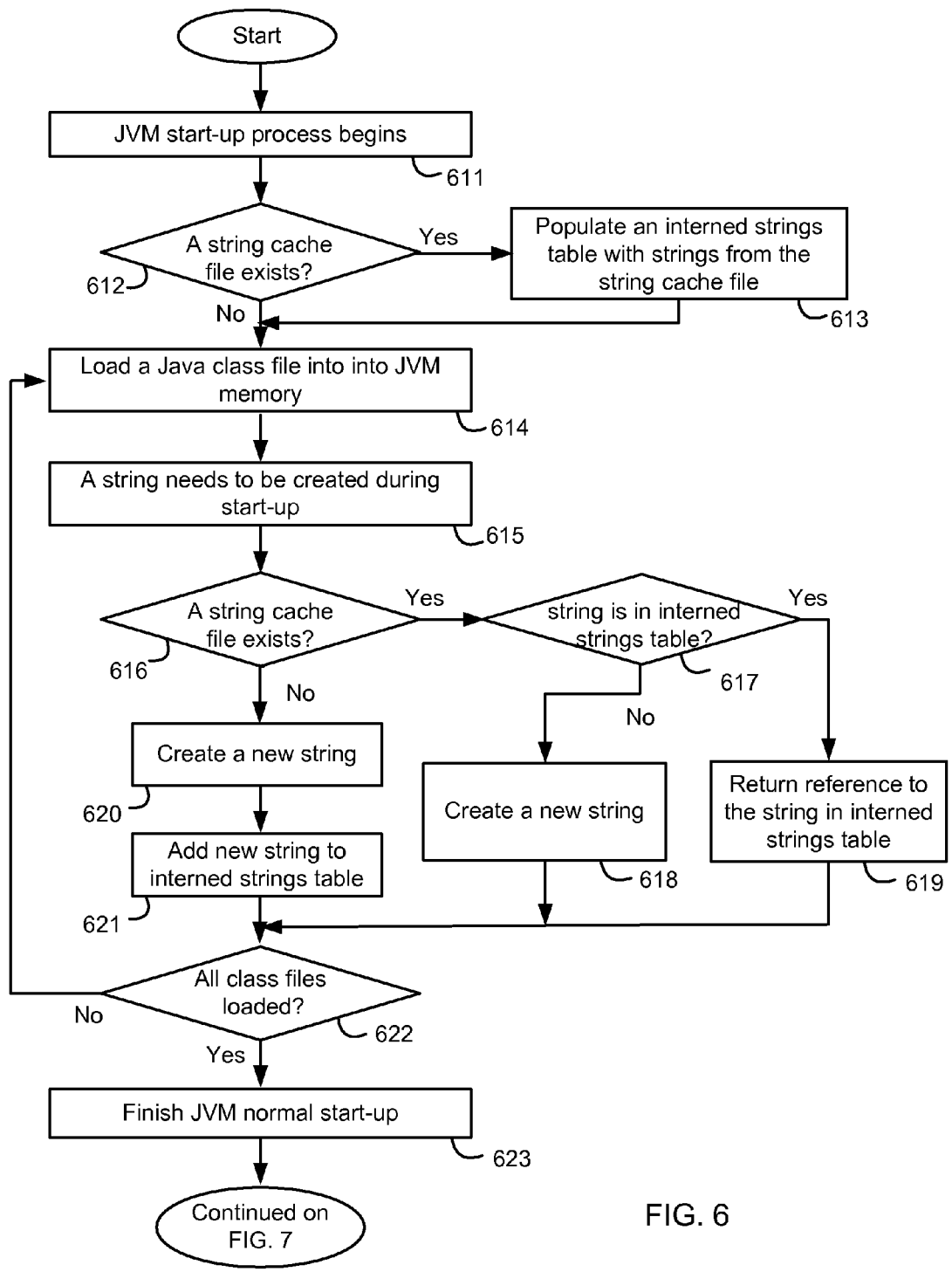
FIG. 6 is $_{[Romelia\ F2]}$ a flow chart of a more detailed exemplary process for optimizing the memory space used for duplicate string objects in a Java virtual machine, in accordance with aspects of the invention.

FIG. 6 is [Romelia F4] a flow chart of a more detailed exemplary process for reducing system memory used for duplicate string objects in a virtual machine, in accordance with aspects of an embodiment of the invention. The illustrated embodiment is a Java virtual machine, but may be a non-Java virtual machine in other embodiments of the invention. The flow chart in FIG. 6 is generalized to cover the case in which another virtual machine instance has previously created a string cache file 311, as well as the case in which no string cache file currently exists in the system. For example, the first instance of a virtual machine running in the system would not find an existing string cache file. At block 611, a Java virtual machine 300 instance begins its start-up process, which includes the Java virtual machine 300 initializing parameters specific to a Java application. The Java virtual machine 300 determines, at block 612, whether a string cache file 311 currently exists for handling duplicate strings in the computer system. Another Java virtual machine instance running in the system might have previously created this string cache file. In that case, other Java virtual machine instances do not need to create the string cache file again, but use the existing string cache file to populate the interned strings table. Thus, at block 613, if a string cache file 311 is currently in use in the system, then the Java virtual machine 300 adds the string objects in the string cache file 311 to an interned strings table.

At block 614, the Java virtual machine loads a relevant Java class file into the virtual machine's memory. During this stage of the start-up process, if the Java virtual machine needs to create a new string, per block 615, then the Java virtual machine determines whether a string cache file 311 currently exists in the system, at block 616. If a string cache file is available, then the Java virtual machine determines, at block 617, whether the required string is already in the interned strings table. The current Java virtual machine or another Java instance might have interned the required string in the table. If the required string is in the interned strings table, then a reference to the string in the interned strings table is returned at block 619. Otherwise, the Java virtual machine creates a new string object per block 618. The Java virtual machine repeats this process for each class file loaded into memory, as shown by block 622 and the loop back to block 614. Once Java virtual machine 300 completes the loading of the class files, it continues on to finish the normal start-up process at block 623. If Java virtual machine 300 determines at block 616 that there is currently no string cache file 311 in the system, then it creates a new string at block 620 and adds the new string to the interned string table at block 621. The Java virtual machine determines whether all class files have been loaded into system memory, at block 622, and finishes the normal start-up process at block 623 if all relevant class files have been loaded. The exemplary process for reducing system memory associated with duplicate strings in a Java virtual machine continues in FIG. 7.

Figure 7:
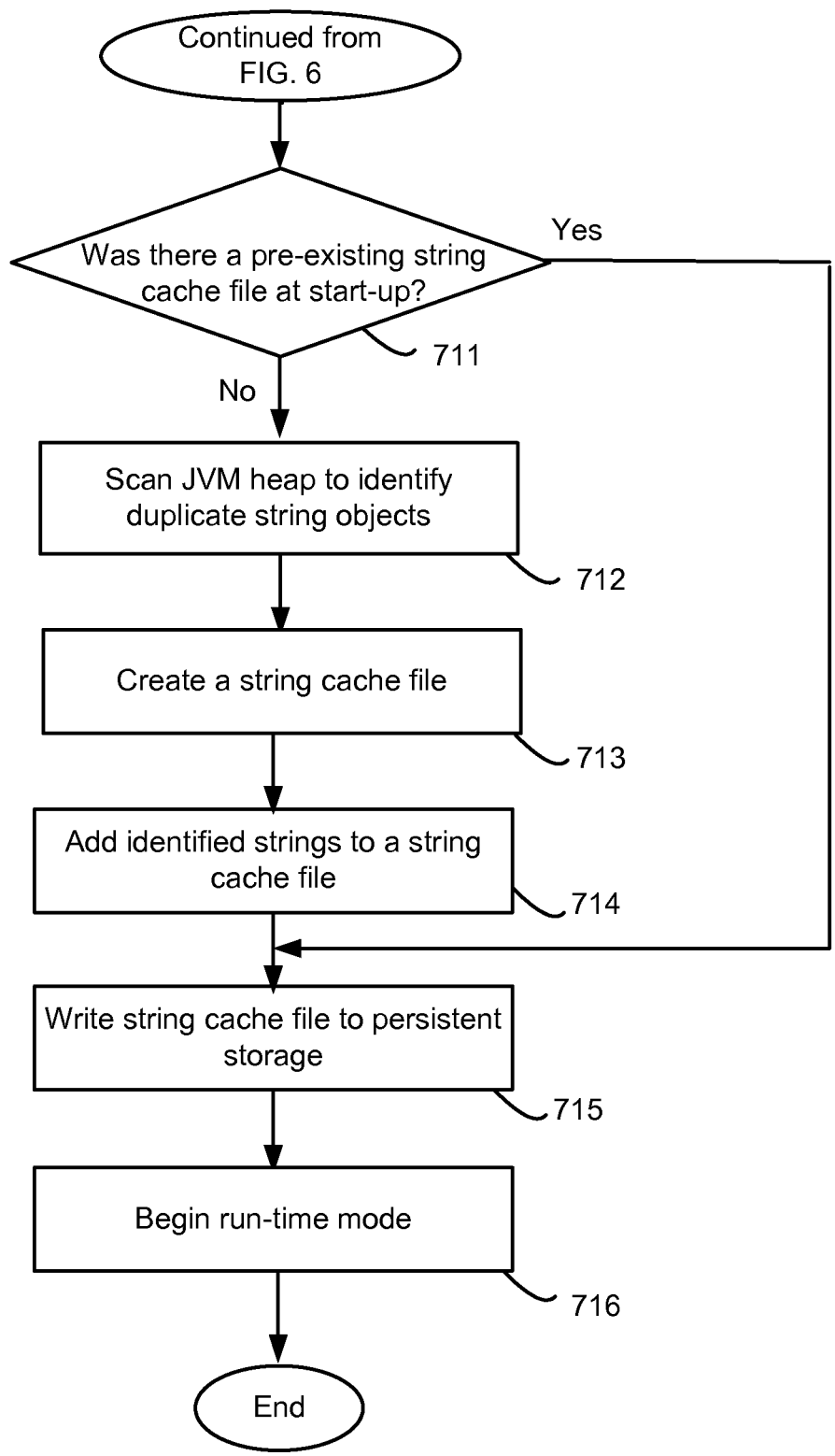
FIG. 7 is $_{[Romelia\ F3]}$ a flow chart representing the operations that continue from the exemplary process illustrated in FIG. 6.

FIG. 7 shows a flow chart representing the operations that continue from the process in FIG. 6, according to an embodiment of the invention. Once the Java virtual machine completes its start-up process at block 623, it determines whether a string cache file 311 existed at the beginning of the Java virtual machine start-up. Another Java virtual machine instance running in the system might had previously created such a string cache file. If no string cache file 311 was pre-existing, then the Java virtual machine scans its Java heap at block 712 to identify duplicate string objects in the Java heap. The Java virtual machine creates a string cache file 311 at block 713, and adds the identified duplicate strings to the string cache file 311 at block 714. The Java virtual machine then writes the string cache file 311 to persistent storage at block 715 and enters its run-time mode at block 716. If, on the other hand, the Java virtual machine determines at block 711 that there was a pre-existing string cache file 311 at the beginning of the Java virtual machine's start-up, then the Java virtual machine writes the string cache file 311 to persistent storage at block 715, and enters begins its run-time mode at block 715 without performing actions in blocks 712, 713 and 714.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A computer-implemented method for optimizing memory usage in a virtual machine having a memory heap, comprising:
   determining whether or not a string cache file exists at a beginning of a start-up process;
   in response to the determining that the string cache file does not exist at the beginning of the start-up process:
      creating a new string and adding the new string to an interned strings table;
      scanning the memory heap at the end of the start-up process of the virtual machine to identify duplicate strings associated with the virtual machine; and
      storing the identified duplicate strings in a string cache file; and
   in response to the determining that the string cache file exists at the beginning of the start-up process:
      adding string objects from the string cache file to the interned strings table;
      determining whether or not a string to be created is in the interned strings table;
      in response to the determining that the string to be created is in the interned strings table, returning a reference to the string to be created in the interned strings table; and
      in response to the determining that the string to be created is not in the interned strings table, creating a new string in the memory heap.

2. The method of claim 1, further comprising loading a class file into the virtual machine and wherein the added strings are associated with the loaded class file.

3. The method of claim 1, wherein the virtual machine continues with the start-up process if no string was created during the start-up process.

4. The method of claim 3, further comprising determining whether the string cache file currently exists for the virtual machine if a string was created during the start-up process.

5. The method of claim 1, wherein the string cache file is in system memory and written to persistent storage at the end of the start-up process.

6. A non-transitory computer-usable device storing a computer readable program code for optimizing memory usage in a virtual machine having a memory heap, wherein the program code is operable to:
   determine whether or not a string cache file exists at a beginning of a start-up process;
   in response to the determining that the string cache file does not exist at the beginning of the start-up process:
      create a new string and add the new string to an interned strings table;
      scan the memory heap at the end of the start-up process of the virtual machine to identify duplicate strings associated with the virtual machine; and
      store the identified duplicate strings in a string cache file; and
   in response to the determining that the string cache file exists at the beginning of the start-up process:
      add string objects from the string cache file to the interned strings table;
      determine whether or not a string to be created is in the interned strings table;
      in response to the determining that the string to be created is in the interned strings table, return a reference to the string to be created in the interned strings table; and
      in response to the determining that the string to be created is not in the interned strings table, create a new string in the memory heap.

7. The computer-usable device of claim 6, wherein the program code is further operable to load a class file into the virtual machine, wherein the added strings are associated with the loaded class file.

8. The computer-usable device of claim 6, wherein the program code is further operable to continue with the start-up process if no string is created during the start-up process.

9. The computer-usable device of claim 8, wherein the program code is further operable to determine whether the string cache file currently exists for the virtual machine if a string was created during the start-up process.

10. The computer-usable device of claim 6, wherein the string cache file is in system memory and written to persistent storage at the end of the start-up process.

* * * * *